(12) United States Patent
Richter

(10) Patent No.: US 7,178,771 B2
(45) Date of Patent: Feb. 20, 2007

(54) SUPPORT CONSOLE WITH PIVOTABLE SUPPORT PLATE

(75) Inventor: Harald Richter, Höhenstrasse 32, 75331 Engelsbrand (DE)

(73) Assignee: Harald Richter, Engelbrand (DE)

( * ) Notice: Subject to any disclaimer, the term of this patent is extended or adjusted under 35 U.S.C. 154(b) by 277 days.

(21) Appl. No.: 10/902,533

(22) Filed: Jul. 29, 2004

(65) Prior Publication Data
US 2005/0045794 A1    Mar. 3, 2005

(30) Foreign Application Priority Data
Aug. 25, 2003   (DE)   ............................ 203 13 215 U

(51) Int. Cl.
A45D 42/14   (2006.01)
(52) U.S. Cl. ................ 248/205.8; 248/205.5; 248/206.2; 248/309.3
(58) Field of Classification Search ............ 248/205.5, 248/205.6, 205.7, 205.8, 205.9, 206.1, 206.2, 248/206.3, 206.4, 363, 362, 683, 467, 292.12, 248/309.3
See application file for complete search history.

(56) References Cited

U.S. PATENT DOCUMENTS

| | | | | |
|---|---|---|---|---|
| 4,858,868 A | * | 8/1989 | Hoffelner | 248/292.12 |
| 6,079,683 A | * | 6/2000 | Lin | 248/292.12 |
| 6,572,060 B2 | * | 6/2003 | Yoon | 248/163.1 |
| 6,749,160 B1 | * | 6/2004 | Richter | 248/206.2 |
| 6,913,232 B2 | * | 7/2005 | Richter | 248/205.8 |
| 7,014,233 B2 | * | 3/2006 | Chen | 294/64.1 |

FOREIGN PATENT DOCUMENTS

FR   2684148 A1 *  5/1993

\* cited by examiner

Primary Examiner—Gwendolyn Baxter
(74) Attorney, Agent, or Firm—Klaus J. Bach

(57) ABSTRACT

In a support console with a pivotable support structure for the position adjustable mounting of an apparatus such a minicomputer, a support plate is pivotally supported on a console column which is provided at an end thereof with a base receiving a suction membrane and a membrane operating mechanism is operatively connected to the suction membrane and disposed enclosed in the console column with only an operating lever extending from the interior of the console column to the outside for actuating the suction structure.

8 Claims, 4 Drawing Sheets

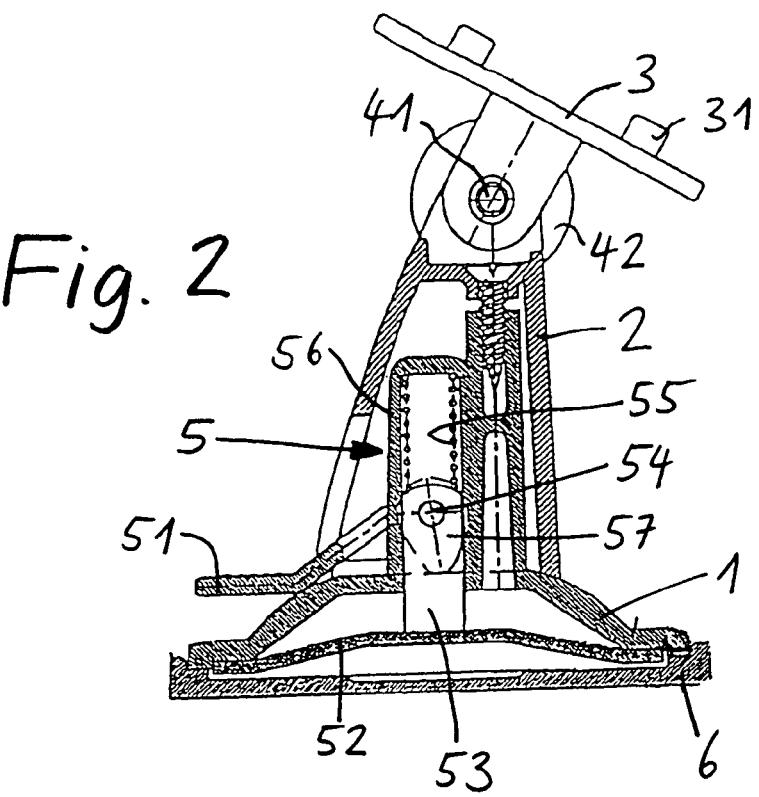
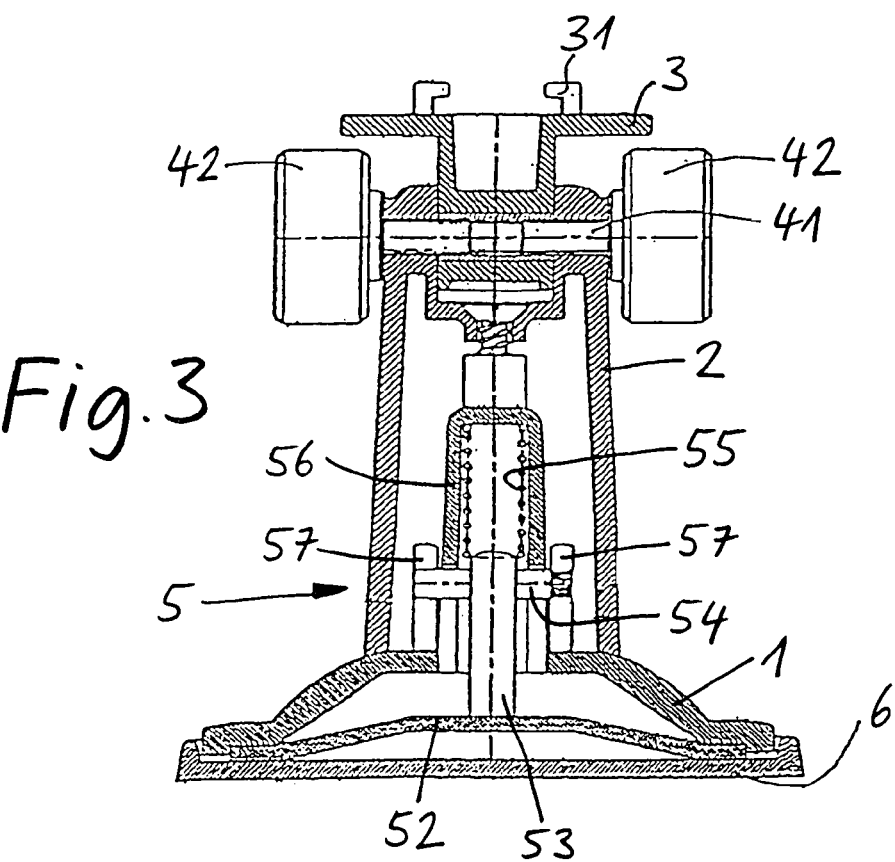

SUPPORT CONSOLE WITH PIVOTABLE SUPPORT PLATE

BACKGROUND OF THE INVENTION

The invention relates to a support console with a pivotable support plate for the position-adjustable support of small apparatus such as minicomputers known under the designation "PDA" (Personal Data Assistant), mobile navigation apparatus, cellular telephones and similar equipment.

Such support consoles are used particularly in motor vehicles for supporting equipment of the type referred to above on a dashboard or on a center console in an orientation and position which is adjustable so as to make their use convenient depending on the spatial relation of the user and mounting location of the support console.

A support console is already known which comprises a support leg and a support plate mounted on the support leg by way of a ball joint. The support plate is therefore pivotable and rotatable relative to the support leg so that an apparatus mounted onto the support plate can be adjusted in a simple manner to any desired angular and pivotal position.

It is the object of the present invention to provide a support console of the type referred to above, which can be easily attached at a suitable location, which is easily position-adjustable but provides for firm support of an apparatus mounted thereon and which has a clean attractive appearance.

SUMMARY OF THE INVENTION

In a support console with a pivotable support structure for the position adjustable mounting of apparatus such as a minicomputer, a support plate is pivotally supported on a console column which is provided at an end thereof with a base receiving a suction membrane and a membrane operating mechanism is operatively connected to the suction membrane and disposed enclosed in the console column with only an operating lever extending from the interior of the console column to the outside for actuating the suction structure within the console column.

The arrangement according to the invention provides for a support structure for the support joint arrangement of the console in the form of a hollow column, in which a suction mechanism is enclosed for the mounting of the support console onto a support surface. The hollow column provides not only for a rigid warp-free support, but it also accommodates the suction mechanism invisibly and well protected from adverse influences.

The arrangement provides for a universal position adjustability of the apparatus supported by the support console in any desired orientation and permits a locking of the position which can be maintained even when the support console is subjected to vibrations as they may occur specifically if the console is mounted in a motor vehicle.

The invention will be described below in greater detail below on the basis of the accompanying drawings.

BRIEF DESCRIPTION OF THE DRAWINGS

FIG. 2 is a cross-sectional view of the support console as shown in FIG. 1, FIG. 3 is a cross-sectional view of the support console as shown in FIG. 1 taken along a cross-sectional plane rotated by 90° with respect to that of FIG. 2.

DESCRIPTION OF PARTICULAR EMBODIMENTS

Figure 1:
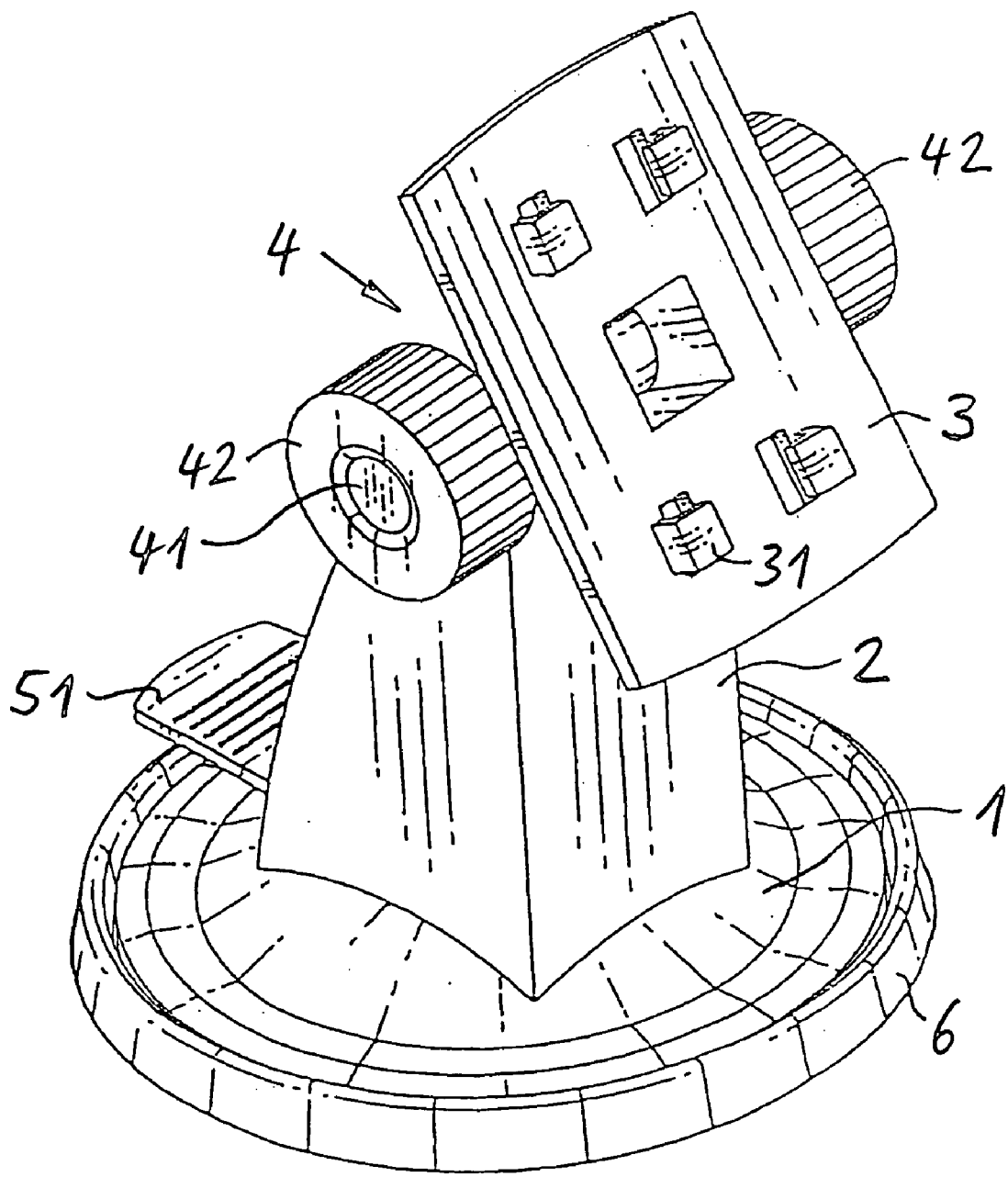
FIG. 1 shows a support console according to the invention in a perspective view.

In the relatively simple embodiment of the support console according to the invention as shown in FIGS. 1–3, the support console comprises a base 1 with a hollow column 2 projecting upwardly therefrom and a support plate 3 mounted onto the column 2 by a joint structure 4. In the interior of the column 2 and the base 1 a vacuum suction mechanism 5 is disposed of which in FIG. 1 only the operating lever 51 projecting through an opening in the column 2 is visible. Furthermore, the embodiment of the support console as shown in FIG. 1 is shown disposed on a base plate 6, which is not necessary if the support console can be mounted onto a smooth surface, but which is used for mounting the console onto another uneven surface. Then the base plate 6 is screwed or cemented or otherwise firmly attached to such other surface and provide for a smooth surface for the mounting of the console onto the base plate 6 by the vacuum suction mechanism 5. The base plate 6 may be mounted in a motor vehicle for example onto a center console, the dashboard or another suitable place. The base plate 41 is only used when no smooth surface is available that is the available surfaces are grained for example so that a vacuum suction device will not hold. If a smooth surface is available, the suction device can be directly attached to the smooth surface. However, the rimmed base plate 2 also prevents side-ward sliding of the support console 2 for example under the influence of centrifugal forces and vibrations.

FIG. 1 further shows that the support plate 2 is provided at its top side with an arrangement of four projecting claws 31, which co-operate with corresponding counter elements of an apparatus carrier to be mounted onto the support plate 3 so that the apparatus carrier can be rapidly coupled to the support plate 3.

The joint mechanism 4 is very simple in the embodiment shown in FIGS. 1–3. It includes only one hinge axis 41 and clamping wheels 42 for locking the support plate 3 in a selected inclination position. The clamping wheels frictionally engage the joint parts so that they are locked together in the selected position.

The cross-sectional views of FIGS. 2 and 3 show the arrangement of the vacuum suction mechanism 5 in the hollow space within the support console 2.

A vacuum suction device formed by a flexible membrane 52 is connected to a shaft 53 which is provided with a transverse rod 54 and is biased by a compression spring 55 disposed in a guide sleeve 56 downwardly in the release position of the vacuum suction device. The opposite ends of the shaft 53 project from the guide sleeve 56 and support cams 57 of the forked operating lever 51. When the operating lever 51 is pushed downwardly (into the position as shown in FIGS. 1–3), the cams riding on the base 1 raise the transverse rod 54 and the shaft 53 and, together therewith lift the center of the membrane 52 to generate a vacuum between the support surface (the base plate) and the membrane to thereby firmly engage the column 2 and its base 1 with the support surface.

The suction membrane 52 of the suction mechanism 5 is disposed in the hollow space of the base 1 whereas the operating mechanism of the suction mechanism is arranged in the hollow space of the console column 2. The vacuum suction mechanism including its operating structure is therefore invisible in the interior of the support console. The console column 2 forms—as apparent from the drawings—a stable, rigid, warp-free connection between the base 1 and the joint mechanism 3, so that the support plate 3, that is the shaft 41 of the mechanism 3, remains free of vibrations even during shocks and shakes of a vehicle thereby providing a stable support structure for the support plate 3 and any apparatus mounted thereon. At the same time, the support console forms a compact closed structure with an appealing appearance.

Figure 4:
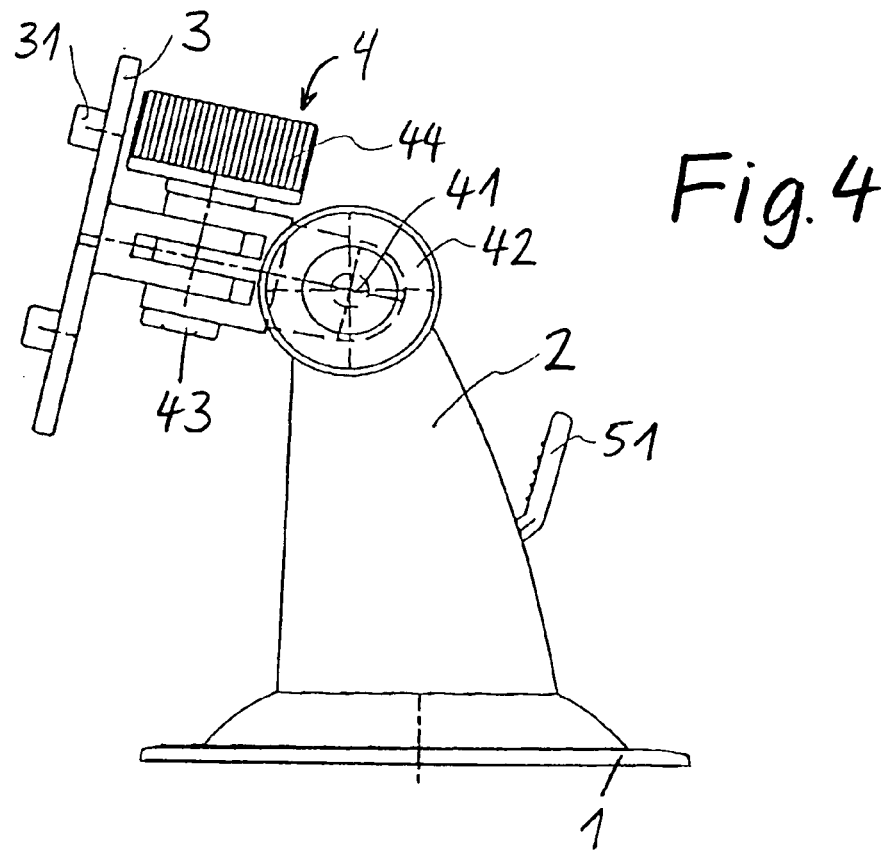
FIG. 4 is a side view of the support console according to the invention showing an additional pivot structure.

In the embodiment of the invention according to FIG. 4, the joint structure 4 between the support plate 3 and the column 2 comprises an additional hinge with a hinge shaft 43, which extends normal to a plane receiving the hinge shaft 41 of the hinge shown also in FIGS. 1–3 and which is provided with a clamping wheel 44 for locking the hinge. In this way, the support plate 3 can be pivoted and be inclined in any direction. In addition, the console can be rotated (after the release of the suction device) about its vertical axis, that is, the axis of the circular base 1. The base plate 6 shown in FIGS. 1–3 is not shown in FIG. 4.

Figure 5A:
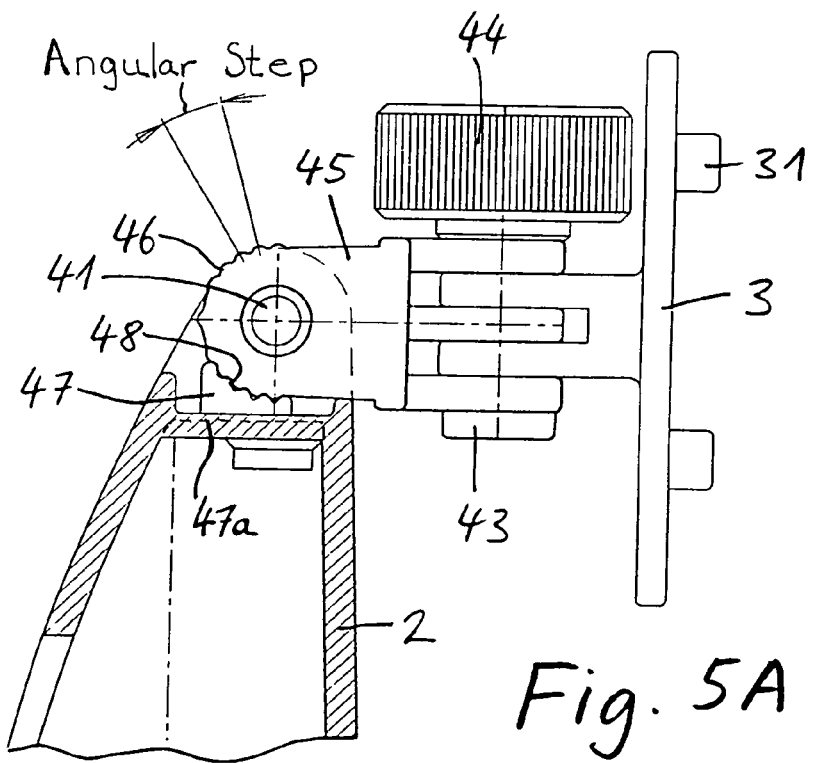
FIGS. 5A, 5B and 5C show part of the support console according to the invention with certain modifications.
Figure 5B:
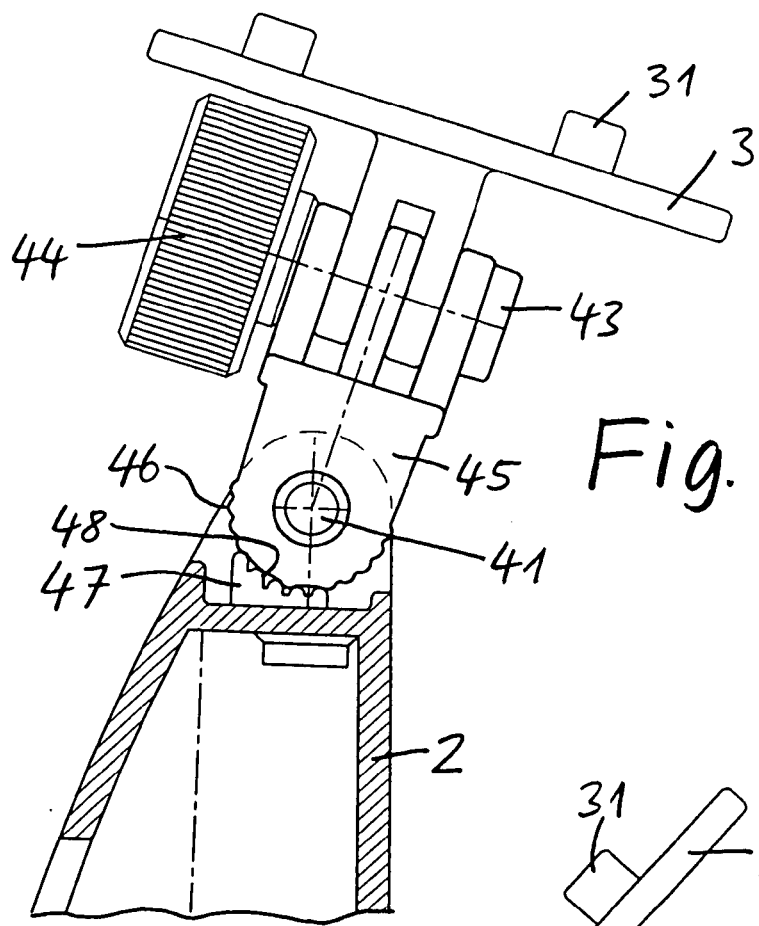
Figure 5C:
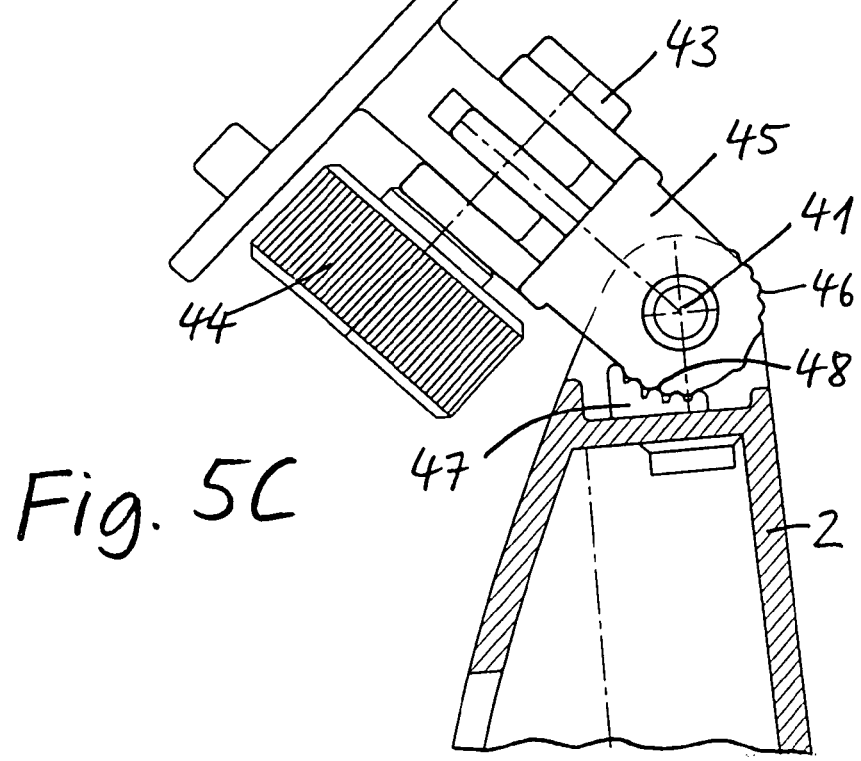

FIGS. 5A, 5B and 5C show an embodiment of FIG. 4, without the base area of the support console and the vacuum suction mechanism.

In this embodiment, instead of a clamping structure for the hinge shaft 41 an arresting structure is provided which facilitates the adjustment of the inclination angle in small angular steps. To this end, the hinge element of the console 2 is provided with a notched circular section 46, which cooperates with a corresponding engagement structure 47 on the console 2 and which includes a circular segment with a number of engagement cams 48. The engagement structure 47 is resiliently supported on the console 2 and biased toward the notched circular section 46 so that the circular section 46 and the engagement cams engage one another automatically and pivoting from one engagement position to another can be achieved simply by applying a sufficiently large pivot force. The engagement structure is resiliently supported preferably by a web 47a (indicated by a dashed line) which is mounted on the console 2. The whole arrangement consists preferably of a plastic material with a certain elasticity which permits a resilient displacement of the engagement structure. Of course, other arrangements are possible such as a slide support arrangement for the engagement structure 47 and means such as a leaf spring formed by the web 47a or another spring for biasing the engagement structure 47 toward the notched circular section 46. In this case, the engagement force could be adjustable by a control screw.

What is claimed is:

1. A support console with a support plate (3) pivotally supported on the console for adjustably supporting a small apparatus, said support console comprising a base (1), a support column (2) extending from the base (1), and supporting the support plate (3), said support plate (3) having means for engaging said small apparatus, a vacuum suction structure with a membrane disposed in the support column and, respectively, the base for attaching the support console to a support surface, said support column further including an operating mechanism (53–57) for the vacuum suction structure in the base (1) of the console and having an opening through which only an operating lever (51) of the operating mechanism extends to the outside of the column for actuating the suction structure in the base (1) of the support console.

2. A support console according to claim 1, wherein the operating mechanism includes a shaft (53) connected to the membrane (52), a lift cam (57) formed on the operating lever (51) which is connected to the shaft (53) and a return spring (55) biasing the shaft toward the membrane (52), all disposed within the column (2) of the console.

3. A support console according to claim 1, wherein the support plate (3) is pivotally supported on the console by a hinge structure (4) including two serially arranged hinges with a first hinge shaft (41) extending normal to a longitudinal axis of the support console (2) and a second hinge shaft (43) extending normal to a plane receiving the first hinge shaft (41) and means of locking the hinges in any selected position.

4. A support console according to claim 3, wherein the means for locking the hinges comprises in each case a clamping wheel (42, 44) for axially compressing the hinges into frictional engagement positions.

5. A support console according to claim 3, wherein the first hinge (41) includes an engagement structure comprising a pivot member (45) with a circular engagement section (46) and a corresponding counter element (47) mounted on the console column (2) with engagement projections for engagement with recesses formed in the circular engagement section (46).

6. A support console according to claim 5, wherein the counter element (47) is mounted onto the console column (2) by a resilient connecting web.

7. A support console according to claim 5, wherein the counter element (47) is movably supported on the console column (2) and a spring is provided for biasing the counter element (47) toward the circular engagement section (46).

8. A support console according to claim 1, wherein the support plate (3) includes four claws (31) for engaging any apparatus which is supported on the support plate (3) and is provided with corresponding counter elements for engagement with the claws (31).

* * * * *

(12) EX PARTE REEXAMINATION CERTIFICATE (7348th)
United States Patent
Richter

(10) Number: US 7,178,771 C1
(45) Certificate Issued: Feb. 2, 2010

(54) SUPPORT CONSOLE WITH PIVOTABLE SUPPORT PLATE

(76) Inventor: Harald Richter, Höhenstrasse 32, 75331 Engelsbrand (DE)

Reexamination Request:
No. 90/010,310, Nov. 4, 2008

Reexamination Certificate for:
Patent No.: 7,178,771
Issued: Feb. 20, 2007
Appl. No.: 10/902,533
Filed: Jul. 29, 2004

(51) Int. Cl.
*A45D 42/14* (2006.01)

(52) U.S. Cl. .............. 248/205.8; 248/205.5; 248/206.2; 248/309.3

(58) Field of Classification Search .................. None
See application file for complete search history.

(56) References Cited

U.S. PATENT DOCUMENTS

| | | | |
|---|---|---|---|
| 2,965,345 | A | 12/1960 | Gundelfinger et al. |
| 4,043,531 | A | 8/1977 | Green |
| 4,308,769 | A | 1/1982 | Rantanen |
| 5,779,205 | A | 7/1998 | Ching |
| 6,234,435 | B1 | 5/2001 | Yeh |
| 6,464,185 | B1 | 10/2002 | Minelli et al. |
| 7,066,434 | B2 | 6/2006 | Kwok |
| 7,178,771 | B2 | 2/2007 | Richter |

*Primary Examiner*—Catherine S. Williams

(57) ABSTRACT

In a support console with a pivotable support structure for the position adjustable mounting of an apparatus such a minicomputer, a support plate is pivotally supported on a console column which is provided at an end thereof with a base receiving a suction membrane and a membrane operating mechanism is operatively connected to the suction membrane and disposed enclosed in the console column with only an operating lever extending from the interior of the console column to the outside for actuating the suction structure.

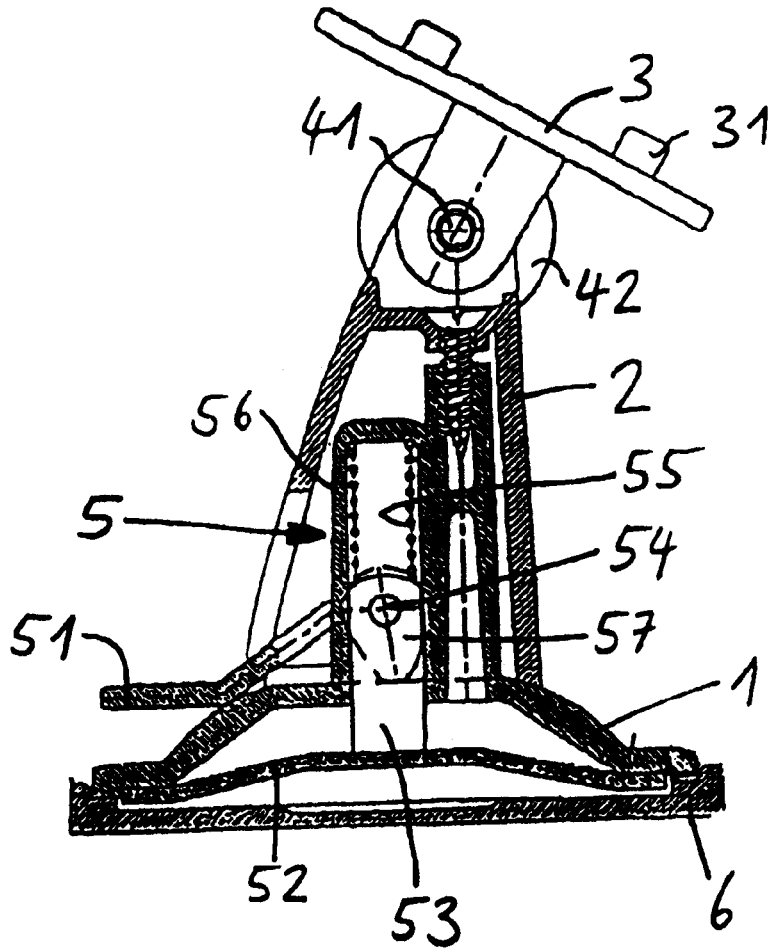

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; metter printed in italics indicated additions made to the patent.

ONLY THOSE PARAGRAPHS OF THE SPECIFICATION AFFECTED BY AMENDMENT ARE PRINTED HEREIN.

Column 2, lines 9–35:

In the relatively simple embodiment of the support console according to the invention as shown in FIGS. 1–3, the support console comprises a base 1 with a hollow column 2 projecting upwardly therefrom and a support plate 3 mounted onto the column 2 by a joint structure 4. In the interior of the column 2 and the base 1 a vacuum suction mechanism 5 is disposed of which in FIG. 1 only the operrating lever 51 projecting through an opening in the column 2 is visible. Furthermore, the embodiment of the support console as shown in FIG. 1 is shown disposed on a base plate 6, which is not necessary if the support console can be mounted onto a smooth surface, but which is used for mounting the console onto another uneven surface. Then the base plate 6 is screwed or cemented or otherwise firmly attached to such other surface and provide for a smooth surface for the mounting of the console onto the base plate 6 by the vacuum suction mechanism 5. The base plate 6 may be mounted in a motor vehicle for example onto a center console, the dashboard or another suitable place. The base plate 41 is only used when no smooth surface is available that is the available surfaces are grained for example so that a vacuum suction device will not hold. If a smooth surface is available, the suction device can be directly attached to the smooth surface. However, the rimmed base plate [2] *6* also prevents sideward sliding of the support console 2 for example under the influence of centrifugal forces and vibrations.

Column 2, lines 36–41:

FIG. 1 further shows that the support plate [2] *3* is provided at its top side with an arrangement of four projecting claws 31, which co-operate with corresponding counter elements of an apparatus carrier to be mounted onto the support plate 3 so that the apparatus carrier can be rapidly coupled to the support plate 3.

Column 2, lines 51–64:

A vacuum suction device formed by a flexible membrane 52 is connected to *a membrane operating mechanism including* a shaft 53 which is provided with a transverse rod 54 and is biased by a compression spring 55 disposed in a guide sleeve 56 downwardly in the release position of the vacuum suction device. *The guide sleeve 56 extends from the support plate 1 into the interior of the support column 2.* The opposite ends of the shaft 53 project from the guide sleeve 56 and support cams 57 of the forked operating lever 51. When the operating lever 51 is pushed downwardly (into the position as shown in FIGS. 1–3), the cams riding on the base 1 raise the transverse rod 54 and the shaft 53 and, together therewith lift the center of the membrane 52 to generate a vacuum between the support surface (the base plate) and the membrane to thereby firmly engage the column 2 and its base 1 with the support surface.

AS A RESULT OF REEXAMINATION, IT HAS BEEN DETERMINED THAT:

Claim 1 is determined to be patentable as amended.

Claims 2–8, dependent on an amended claim, are determined to be patentable.

1. A support console with a support plate (3) pivotally supported on the console for adjustably supporting a small appparatus, said support console comprising a base (1), a support column (2) extending from the base (1), and supporting the support plate (3), said support plate (3) having means for engaging an apparatus, a vacuum suction structure with a membrane disposed in the support column and, respectively, the base for attaching the support console to a support surface, said support column further including an operating mechanism (53–57) *comprising a guide sleeve (56) with a shaft (53) guided therein and connected to said membrane, and an operating lever (51) acting on said shaft (53) for operating* the vacuum suction structure in the base (1) of the console and *the support column (2)* having an opening through which only [an] *the* operating lever (51) of the operating mechanism extends to the outside of the column for actuating the suction structure in the base (1) of the support console.

* * * * *